United States Patent
Bronstein

[15] 3,697,629
[45] Oct. 10, 1972

[54] METHOD AND PRODUCT OF MAKING MULTIFOCAL CONTACT LENSES AND LENS BLANKS

[72] Inventor: Leonard Bronstein, 7457 East Vista Drive, Scottsdale, Ariz. 85251

[22] Filed: Feb. 26, 1970

[21] Appl. No.: 14,269

[52] U.S. Cl. ............... 264/1, 264/162, 264/221, 264/255, 264/337, 351/161, 351/177
[51] Int. Cl. .............................................. B29d 11/00
[58] Field of Search ...........351/177; 264/1, 317, 254

[56] References Cited

UNITED STATES PATENTS

| | | | |
|---|---|---|---|
| R18,427 | 4/1932 | Hammon | 351/177 |
| 2,254,440 | 9/1941 | Moulton | 351/177 |
| 2,333,131 | 11/1943 | Tillyer et al. | 351/177 |
| 2,360,641 | 10/1944 | Bennett et al. | 351/177 |
| 3,270,099 | 8/1966 | Camp | 264/1 |
| 3,297,422 | 1/1967 | Emerson et al. | 264/1 |
| 3,431,327 | 3/1969 | Tsvetaki | 264/1 |

Primary Examiner—Donald J. Arnold
Assistant Examiner—A. H. Koeckert
Attorney—Eric P. Schellin and John A. Robertson

[57] ABSTRACT

This specification discloses a method of making a contact lens blank including the steps of grinding a circular substrate to form a curved surface on a face thereof, forming a plastic mold with a curved surface complemental to that of the substrate and a pair of through passages opening onto its curved surface and of a desired cross-section, inserting a segment of a plastic material having one index of refraction different to that of said substrate and having a cross-section corresponding to that of said passage in each of said passages, clamping said mold to said substrate, bonding said segments to the curved surface of the substrate by heat and fusion, removing said mold from the substrate and segments, and restoring its original shape to the substrate by applying thereto a plastic having an index of refraction different from that of the substrate and segments. Methods having alternative steps are also disclosed.

4 Claims, 17 Drawing Figures

PATENTED OCT 10 1972

INVENTOR.
LEONARD BRONSTEIN
BY
Drummond, Cahill & Phillips
ATTORNEYS

PATENTED OCT 10 1972 3,697,629

INVENTOR.
LEONARD BRONSTEIN
BY
Drummond, Cahill & Phillips
ATTORNEYS

METHOD AND PRODUCT OF MAKING MULTIFOCAL CONTACT LENSES AND LENS BLANKS

This invention relates to a method of making multifocal contact lenses and lens blanks.

In another aspect, this invention relates to a blank for making contact lenses and the lenses proper as new articles of manufacture.

Although substantial advances have been made in the contact lens art, certain vexing problems remain. In the prior art it was known to make multifocal length corneal lenses by various methods. One common method of the prior art is to cut a single curve across the surface of a low index optical quality material. The cavity thus created is then filled with a high index material or materials which are then cured and fused into a monolithic lens blank. When the blank is cut into a lens, the latter will be cut in such a way as to include a portion of the high index material in the lens. The original cavity made in the blank to receive the high index material is curved in the shape of a meniscus. The size and shape of the segment is determined by the depth of the cut in the curved surface. This method necessarily leaves a very thin edge around the perimeter of the segment and is a source of many problems in polishing. Unless extreme care is used, minute portions of this thin edge will be removed in the polishing operation with a resulting defect in the optical quality of the finished lens. There is little margin for error and many rejects result from errors.

An alternative method of the prior art is to first form a polished segment and position the segment in a mold by use of an aligning pin. Then a suitable plastic material of the lower index of refraction is poured around the segment and cured and thus fused to the segment to form a monolithic block of optical quality plastic which can be used as a blank for making the contact lens. There are two major problems inherent in the use of this method. First, extreme care must be used in employing the aligning pin, and concomitant to the use of the aligning pin is the loss of versatility in deployment of the segment with respect to position in the finished lens. The second problem, of even greater concern, is that the plastic used to fill the mold around the segment cannot be taken from standard shelf stock colors which arrive from the manufacturer in solid cured polymer form. The lens blank maker must use a monomer and add his own color to it. This means that each lens has its own distinctive color which cannot be accurately duplicated at a later date in the event that one of the lenses must be replaced. It is possible that if the same lens maker duplicated the lens at a later time he would come very close to the same color, but if it were necessary to have the lens made at another laboratory it would be almost impossible to duplicate the color.

Another known method which is not in use because of the practical problems involved, is to drill a cavity for the reception of a higher index of refraction material. The problem here is the near impossibility of obtaining an optically smooth surface on the sides of the receptacle thus formed. An optically smooth surface will refract light along the angle appropriate to its properties, but will not disperse it in irregular patterns. Such an optically smooth surface is important in preventing glare.

Another problem often encountered in the prior art relates to decentered multifocal segments. A decentered cavity is created and filled with higher index materials. A new curve is cut through the interface leaving the optical center of the near vision portion of the lens in a different plane than the optical center of the distance portion of the lens. This causes the patient to see double or to see a jump of image when passing from the distance portion to the near point portion of the lens. Certain prior art multifocal contact lenses have made the bifocal shape and size out of higher index materials and through proper alignment procedures, have fused the low index material around the high index material in such a way as to eliminate the jump of image when passing from the distance to the near point portion of the lens. However, in solving this problem the methods used required either leaving a thin edge of material making it difficult to polish without chipping the edges, or using a technique involving mixing of colors by the lens maker with the problems mentioned above.

In the contact lens art there are undeveloped areas of great potential in respect to correcting special visual problems. These special visual problems require the placement of odd shaped segments in various positions and attitudes in the finished lens. This must be done with a great deal of precision, and with heretofore existing techniques and methods it can be done only at the expense of a great deal of time and painstaking care. For example, the legal definition of blind in at least one State of the Union is the impairment of central visual acuity to 20/200 or less in the better eye, with best correction by single magnification. By using a plurality of segments in a contact lens, many people whose visual acuity is uncorrectable to 20/200 by formerly known methods can be corrected to 20/200 or better.

Accordingly, it is an object of the present invention to provide a method for making fused multifocal contact lenses having segments whose size and shape may be determined by performing.

Another object of this invention is to provide multifocal contact lenses and blanks for making same which have substantial thickness edges at the juncture of all interfaces of segment and lens with surfaces to be cut and polished, coinciding optical centers, optically smooth surfaces at interfaces between segments and lenses, and segments of varying shapes disposed at any desired position within said lens, all in any desired standard color.

It is yet another object of this invention to provide such a method for the manufacture of special purpose contact lenses which could not heretofore be made in a practical manner.

In yet another aspect, it is an object of this invention to provide a method of accomplishing the foregoing objects utilizing commercially available rods of optical quality plastic materials in standard colors.

Another object of this invention is to provide a new type of contact lens having multifocal length segments, and an absence of glare, double vision and visual jump, which can be constructed of standard color commercially available optical quality material.

Still other and further objects and advantages will become apparent to those skilled in the art from the following description of the invention taken in conjunction with the drawings in which.

Figure 1:
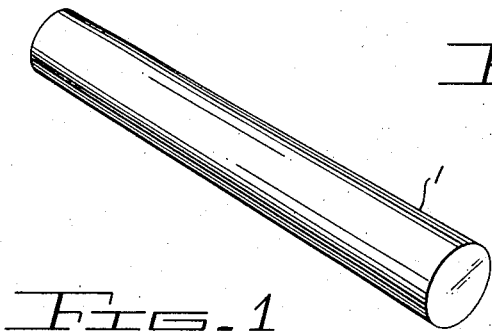
FIG. 1 is a perspective view of a rod of standard optical quality plastic material.

Briefly, I provide a method of making a blank for a multifocal contact lens, the blank having at least one integrally formed optically smooth segment and optical centers which will be coincident in all powers of the finished lens and having, at such points where a ledge interface (communicating between a curve interface and a lens surface) between the segments and the substrate of the blank meets a lens surface to be cut and polished, a substantial thickness edge. The method comprises the following steps: (1) cutting and polishing, on a substrate of first plastic material having a selected index of refraction, a curve interface having at least one radius of curvature such that the lens surface which will intersect the ledge interface will have a cooperating relationship with the curve interface to provide common optical centers in all powers of the lens regardless of the size, shape or position of the segment in the lens; (2) Forming at predetermined sites on the curve interface at least one optically smooth segment of second plastic materials selected shapes in cross section, and selected indices of refraction, said segments having ledge interfaces such as to provide an edge of substantial thickness at points where the ledge interface will meet a lens surface to be cut and polished; (3) Reforming substantially the original shape and dimension of the blank with at least one other plastic material.

I provide for additional steps in the completion of a finished contact lens, the cutting, out of the blank prepared by the steps above described, of a contact lens having anterior and posterior lens surfaces having cooperating radii of curvature where necessary to provide coinciding optical centers in all powers of the lens.

I provide as an alternative method of making a blank for a multifocal contact lens, the blank having at least one integrally formed optically smooth segment and optical centers which will be coincident in all powers of the finished lens and having, at such points where a ledge interface (communicating between a curve interface and a lens surface) between the segments and the substrate of the blank meets a lens surface to be cut and polished, a substantial thickness edge. The alternative method comprises the following steps: (1) Cutting and polishing, on a substrate of first plastic material having a selected index of refraction, a curve interface having at least one radius of curvature such that the lens surface which will intersect the ledge interface will have a cooperating relationship with the curve interface to provide common optical centers in all powers of the lens regardless of the size, shape or position of the segment in the lens; (2) Forming at predetermined sites on the curve interface at least one optically smooth segment of a soluble substance having a selected shape in cross section, the segments having ledge interfaces such as to provide an edge of substantial thickness at points where a ledge interface will meet a lens surface to be cut and polished; (3) Reforming substantially the original shape and dimension of the blank with a second plastic material; (4) Dissolving and removing the segments of the soluble substance to create voids; (5) Filling the voids with plastic material.

I also provide the method described above and further comprising the additional steps in making a finished contact lens by cutting out of the blank a contact lens having anterior and posterior lens surfaces having cooperating radii of curvature where necessary to provide coinciding optical centers in all powers of the lens.

I provide, as a new article of manufacture, a blank for use in making a multifocal contact lens. The blank has a first plastic substrate material having a first index of refraction; at least one segment of second plastic material embedded in the substrate, these segments having at least one other index of refraction differing from the first index of refraction and optically smooth surfaces at all interfaces; at least one curve interface disposed between the substrate material and the segments along arcs such that a lens surface to be cut in said blank will cooperate with the curve interface to provide common optical centers in all powers of the finished lens; ledge interfaces disposed between the substrate material and the segments and extending from the polished curve interface such as to provide edges of substantial thickness on both substrate and segments at such points where the first interfaces will meet a lens surface to be cut.

I also provide, as a new article of manufacture, a multifocal contact lens comprising a first plastic substrate material having a first index of refraction; at least one segment of second plastic material embedded in the substrate, the segments having at least one other index of refraction differing from the first index of refraction and optically smooth surfaces at all interfaces; lens surfaces comprising an optically polished meniscus-shaped posterior surface and an optically polished meniscus-shaped anterior surface; at least one curve interface disposed between the substrate material and the segments along arcs such that at least one lens surface will cooperate with the curve interface to provide common optical centers in all powers of the finished lens; ledge interfaces communicating between each of the curved interfaces and at least one lens surface such as to provide edges of substantial thickness on both substrate and segments at such points where the ledge interfaces meet a cut and polished surface.

Figure 2:
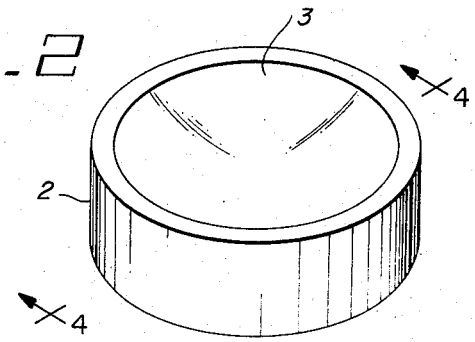
FIG. 2 is an enlarged perspective view of a substrate, with a curved interface cut therein, taken from the rod shown in FIG. 1.
Figure 4:
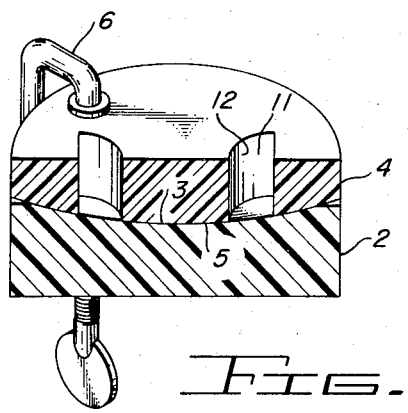
FIG. 4 is a perspective view in section, along the line 4—4, of the mold of FIG. 3 in place on the blank of FIG. 2.
Figure 3:
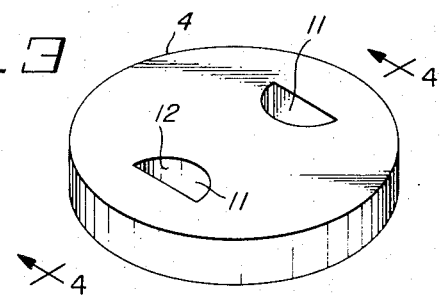
FIG. 3 is a perspective view of a mold to be used in forming segments.
Figure 7:
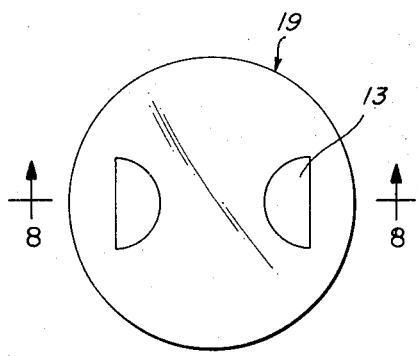
FIG. 7 is a plan view of the lens made from the blank of FIG. 6.
Figure 5:
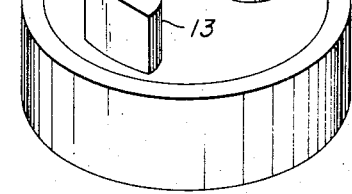
FIG. 5 is a perspective view of the segments in place on the substrate.

Turning now to the drawings in which presently preferred embodiments of my methods and products are depicted. FIG. 1 depicts a rod 1 made of suitable plastic material such as polymethacrylate, which is presently preferred for the uses hereafter described. A substrate 2 is cut from the rod 1 and my process is commenced upon this substrate 2. Before discussing the process, a word about the commercially available plastic materials for use in making contact lenses is in order. They are available in standard reproducible colors from the manufacturer and are sold nationally both as rods, as in FIG. 1, or in the form of substrate blanks, as in FIG. 2. The standard uniform colors are an important convenience in the production of contact lens on a large scale because of the certainty and reliability of the colors provided. If a single lens is lost it can be replaced in exactly the same color by reference to the manufacturer's designation. This is true even if the lens wearer has moved to a distant part of the nation and seeks a replacement in his neighborhood.

The plastic is usually stored for use in the lensmaker's shop in the form of substrate blanks. In accordance with my method, the substrate 2 is prepared by cutting and polishing one or more concave surfaces 3 (or convex, depending upon the result desired) hereafter called the interface curve. One or more radii of curvature as required by the circumstances will have been determined beforehand and the cut will conform to that requirement. These considerations are well known to workers in the art and will not be related in detail. Having achieved the desired radius of curvature, the lens maker will then form segments of a different index of refraction on the surface so created. The preferred embodiment of the method is by use of a reusable mold 4 made of polytetrafluoroethylene or any other suitable substrate. The mold 4 has a bottom surface 5 cut to an approximate radius of curvature with the surface 3 of the blank 2. The bottom 5 of the mold 4 registers with the concave surface 3 of the blank 2 and the two are clamped together by means of a C-clamp 6. The pressure of the clamp 6 must be firm enough to prevent seepage of uncured monomer between the mold 4 and the blank 2. The mold 4 has apertures 11 of the shape desired and has sides 12 (wherein ledge interfaces 22 occur in the blank and finished lens) which are finished to optical smoothness. This term implies a surface which will not disperse light due to excessive texture in the surface. The mold 4 is quite easily provided with such a surface whereas a blank with various configurations of depressions cut into or drilled into its surface cannot be.

A monomer or polyester or other suitable material exhibiting a desired index of refraction is prepared by well known techniques and introduced into the apertures 11 in the mold 4 in liquid form. When the apertures are filled the monomer is cured to a fused solid segment 13 on the blank 2. The mold 4 is removed.

It is important that an edge of substantial thickness be present at the juncture 21 of the ledge interface 22 with the lens surface 17. The prior art conventional methods left a very thin edge, one of substantially zero thickness, at the point where the interface between segment and lens emerged at an interface of plastic and air. In polishing such a surface great care must be taken not to lose portions of the segment edge at this juncture. The method of this invention results in edges of substantial thickness (and thus easily worked) because the acute angle corners of segments and lens at the juncture mentioned are less acute than was possible in the prior art. The precise angle is not critical. The important consideration is that the angle be large enough to avoid the polishing problem. The angles developed by use of this method achieve that.

Figure 6:
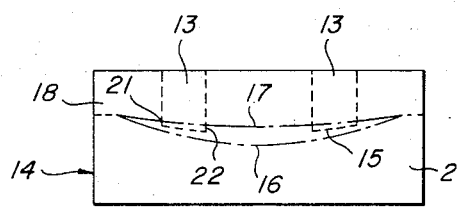
FIG. 6 is a perspective view of a completed blank of FIG. 5 after the cavity carved out of the original blank has been replaced with other material. The segments are indicated in phantom outline.
Figure 8:
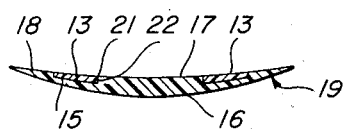
FIG. 8 is the lens of FIG. 7 shown in cross section along the line 8—8.
Figure 10:
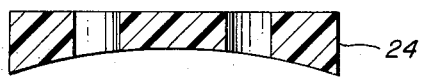
FIG. 10 is a cross section of a mold used in conjunction with the convex curve of FIG. 9.

After the mold has been removed, the original shape of the blank is restored with yet another monomer of third plastic material 18 which is likewise cured to form an integral blank 14 embodying the segments, ready for use in making a finished lens. In FIG. 6 the blank 14 is indicated with the segments 13 integrally formed therein. The line 15 indicates the curve interface of the one index material substrate 2 and the other index material segment 13. Lines 16 and 17 indicate the anterior surface and posterior surface respectively, in a cross section of a lens 19 to be cut from the blank 14.

Figure 9:
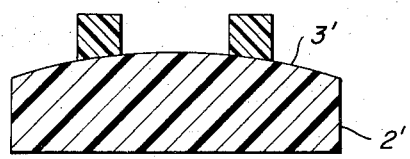
FIG. 9 is a cross section of a blank cut with a convex curve with segments formed thereon.
Figure 14:
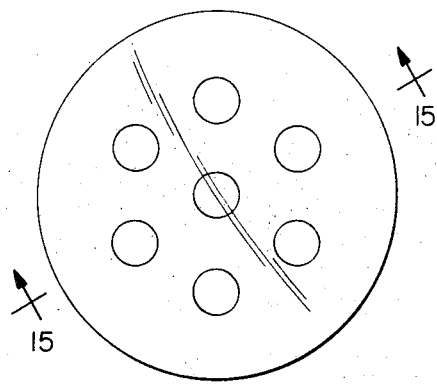
FIG. 14 is a plan view of a novel lens.
Figure 11:
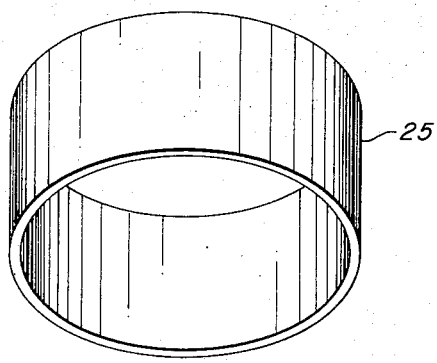
FIG. 11 is a tube mold in perspective.
Figure 15:
FIG. 15 is the lens of FIG. 14 shown in cross section along the line 15—15.
Figure 12:
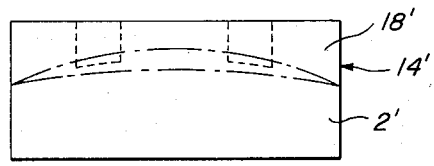
FIG. 12 is an elevation of an integral mold with segments and line of curvature of a lens to be cut therefrom in phantom outline.

The segments are colorless, as is the third plastic material 18. The color of the lens is imparted by the material of the original substrate 2. Obviously the segments could be positioned at the anterior surface 16 of the lens 19 by cutting a convex curve 3' on the blank 2', as shown in FIG. 9, and using a concave mold 24 to mate the curvature 3'. In that case a tube mold 25 should be used around the substrate 2' to retain the third plastic material 18' while curing to the shape of the blank 14'. In this variation the color is likewise imparted to the finished lens by the color of the stock plastic picked off the shelf.

Figure 16:
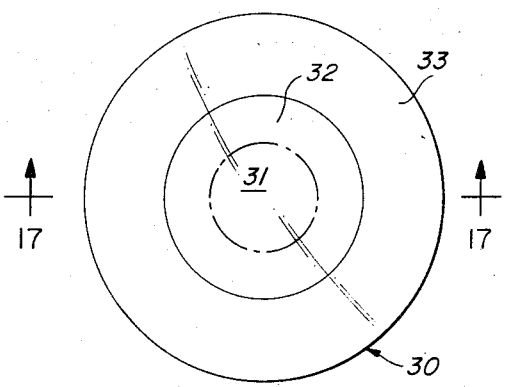
FIG. 16 is a plan view of a trifocal lens.
Figure 13:
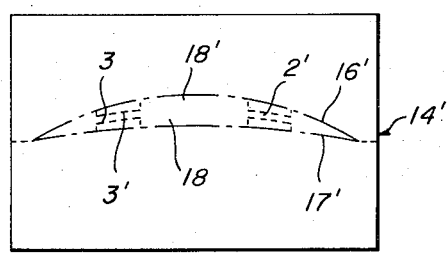
FIG. 13 is an elevation of a blank having more than one curved surface prepared with placement of segments.
Figure 17:
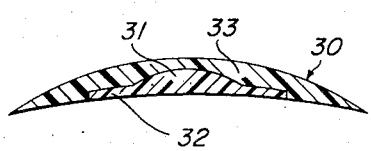
FIG. 17 is a cross section of FIG. 16 along the line 17—17.

More than one surface can be cut on the original substrate 2 by preparing first one surface 3 and then turning the substrate 2 over to prepare the opposite surface 3' on what can now be considered substrate 2' (see FIG. 13), or by cutting multiple radii of curvature on one side only. See FIG. 16 where a trifocal lens 30 has segments 31, 32 in a lower power substrate 33. The radii of curvature of the segments 31 and 32, of the single insert shown have coincident optical centers, however.

Having thus prepared the lens blank, the lens may be prepared by well known techniques from the blank.

An alternative method of preparing the blank is to fill the apertures 11 in the mold 4 with a soluble substance which can be dissolved without affecting the plastic substances. The presently preferred substance is a pitch commonly used in the optical industry and well known to workers in the art.

Temporary segments 13 are formed with the pitch and the monomer of third plastic material 18 is formed around the temporary segments 13 on the surface 3. When the material 18 is cured and fused, the pitch is dissolved and the cavity thus created is filled with the appropriate monomer which is cured to form the segments 13. The blank is then ready for manufacture into a lens in the usual way.

The molds 4 which are used in conjunction with this method are more convenient if provided with radii of curvature designed to mate with the various radii of curvature used in the construction of the surface 3. It is possible, but less convenient, however, to utilize a mold touching the surface 3 only at the perimeter of the shape to be molded because the flexibility of the mold material will permit it to adapt to the curvature of the surface 3.

A gratifying variety of lenses can be constructed by the methods described herein, some having segments shaped and positioned in a manner not heretofore possible.

Characteristics of the new type of lens produced are optically smooth interfaces between segments and lens, substantial thickness edges at points where such interfaces emerge at the anterior or posterior surfaces of the finished lens, common optical centers in all powers of the lens for near, far and intermediate vision, and the complete freedom of design in the placement of the segments in the lens. The added flexibility in design provides the potential for correcting visual abnormalities which have heretofore defied practical application.

Having now fully described my invention and the presently preferred embodiment thereof, I claim:

1. In the making of a blank for a multifocal contact lens, said blank including a substrate having a curved interface and a pair of optically smooth segments, each of said segments presenting a ledge interface of substantial thickness where said segments meet a lens surface to be cut and polished, the method comprising the steps of:
    a. cutting and polishing a curved interface on a substrate of polymethacrylate having a selected index of refraction, said curved surface having at least one radius of curvature;
    b. forming mold of polytetrafluorethylene with a curved surface complemental to said interface and a pair of through passages opening onto said curved surface;
    c. casting a segment of a plastic polyester having an index of refraction different from that of said substrate in each of said passages, said segments having cross-sections corresponding to those of said passages and end surfaces at the curved mold surface;
    d. clamping said mold with the segments therein to said substrate with the curved surface of the mold and the ends of the segments engaging the interface of the substrate;
    e. bonding said segments to said substrate by heat and fusion;
    f. removing said mold from said substrate leaving the segments bonded to the substrate; and
    g. restoring the original shape and dimensions to said substrate by casting thereon a plastic monomer having an index of refraction different from those of said substrate and segments;

whereby said segments present ledge interfaces of substantial thickness at points where the ledge interfaces meet with a lens surface to be cut from said blank and polished.

2. The method of claim 1 together with the additional steps of cutting a contact lens out of said blank, said contact lens having anterior and posterior lens surfaces of cooperating radii of curvature to provide coinciding optical centers in all powers of the lens, and polishing said lens surfaces.

3. In the making of a blank for a multifocal contact lens, said blank including a substrate having a curved interface and a pair of optically smooth segments, each of said segments presenting a ledge interface of substantial thickness where said segments meet a lens surface to be cut and polished, the method comprising the steps of:
    a. cutting and polishing a curved interface on a substrate of polymethacrylate having a selected index of refraction, said curved surface having at least one radius of curvature;
    b. forming a mold of polytetrafluorethylene with a curved surface complemental to said interface and a pair of through passages opening onto said curved surface;
    c. casting a segment of a soluble pitch in each of said passages, said segments having cross-sections corresponding to those of said passages in which they are cast and end surfaces at the curved mold surface;
    d. clamping said mold with the segments therein to said substrate with the curved surface of the mold and the ends of the segments engaging the interface of the substrate;
    e. bonding said segments to said substrate by heat and fusion;
    f. removing said mold from said substrate leaving the segments bonded to the substrate;
    g. restoring the original shape and dimensions of said substrate by casting thereon a plastic monomer having an index of refraction different from that of said substrate;
    h. dissolving sand removing said segments of pitch to create voids; and
    i. casting a plastic polyester having an index of refraction different from those of said substrate and plastic monomer in said voids;

whereby the plastic polyester which replaces the segments of soluble pitch presents ledge interfaces of substantial thickness at points where ledge interfaces will meet a lens surface to be cut from said blank and polished.

4. The method of claim 3 together with the additional steps of cutting a contact lens out of said blank, said contact lens having anterior and posterior lens surfaces of cooperating radii of curvature to provide coinciding optical centers in all powers of the lens, and polishing said lens surfaces.

* * * * *